United States Patent Office 3,497,039
Patented Feb. 24, 1970

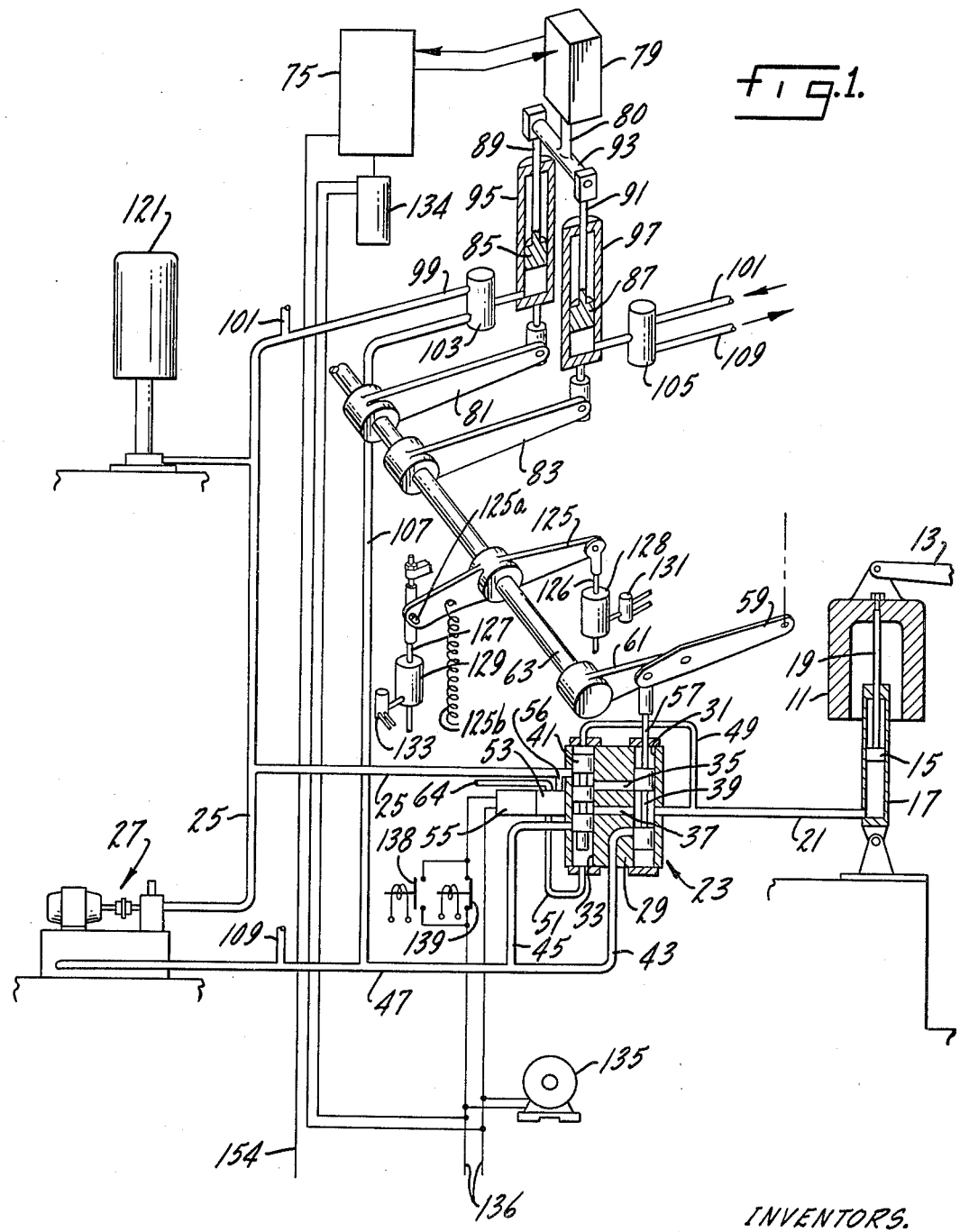

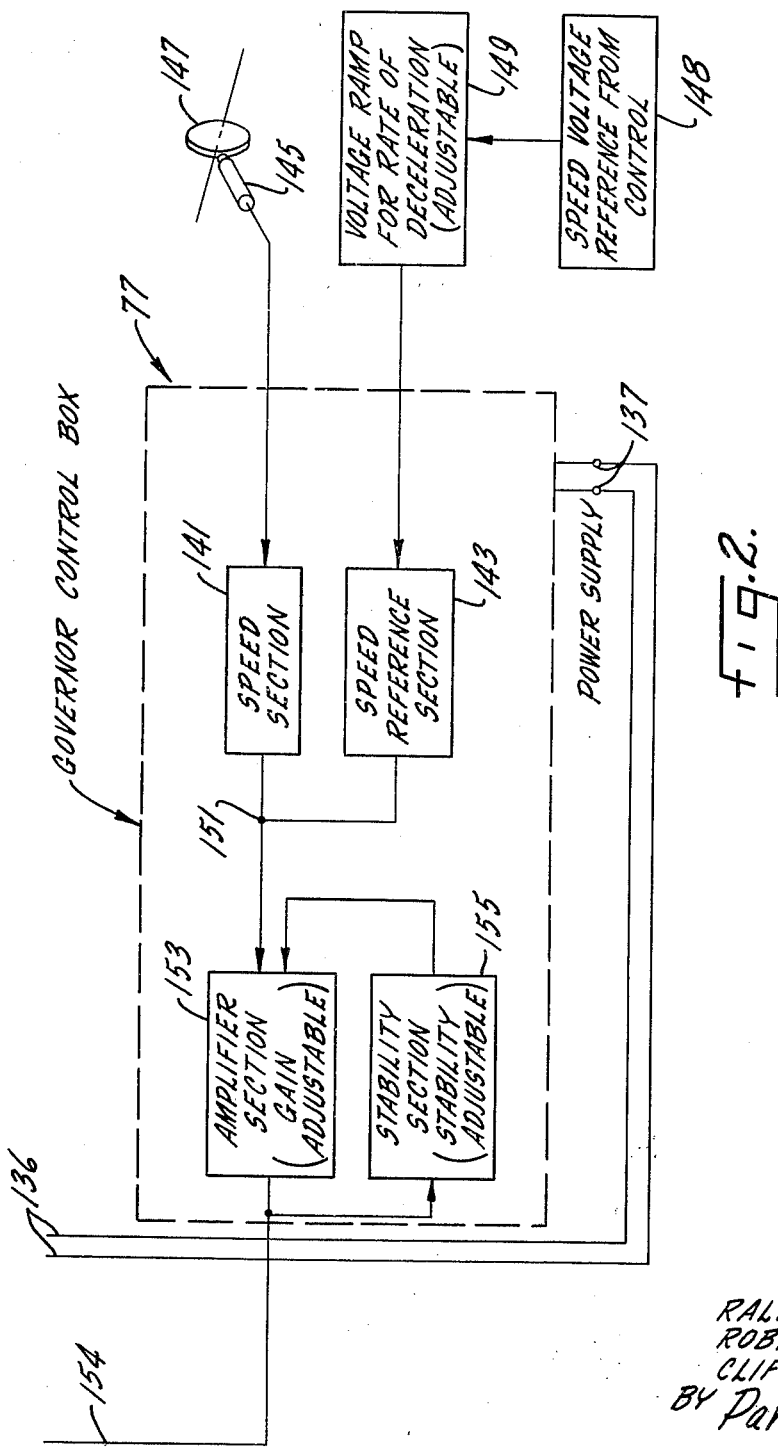

3,497,039
GOVERNOR CONTROLLED EMERGENCY BRAKING SYSTEM
Ralph C. Fuelster, Milwaukee, Robert C. Hardie, Hales Corners, and Clifford G. Pelkola, Pewaukee, Wis., assignors to Nordberg Manufacturing Company, Milwaukee, Wis., a corporation of Wisconsin
Filed Apr. 28, 1967, Ser. No. 634,728
Int. Cl. B60t 8/14
U.S. Cl. 188—180                        7 Claims

ABSTRACT OF THE DISCLOSURE

An emergency braking system for a mine hoist having a weight actuated, hydraulically releasable brake. During emergency operation, the brake is applied by an electric hydraulic actuator which rotates the brake operating rod to move a plunger in the brake valve and thereby release hydraulic fluid from the brake. The rate of application of the brake by the electric hydraulic actuator is determined by an electric governor which continuously compares the speed of the hoist with a reference speed based on a uniform rate of deceleration of the hoist. The electric governor supplies an electrical signal which indicates to the electric hydraulic actuator to apply or release the brake to conform the rate of deceleration of the hoist to the desired uniform rate of deceleration.

SUMMARY OF THE INVENTION

This invention is concerned with an emergency braking system for a mine hoist and more particularly with such a system for braking the hoist drum at a uniform rate of deceleration regardless of the speed of the hoist drum or the location of the skip in the shaft at the time the emergency stop is made.

An object of this invention is an emergency braking system which will bring a hoist conveyance to a full stop in a total elapsed time which is equal to or greater than the periodic time of the hoist conveyance and its supporting wire rope.

Another object is an emergency braking system having an adjustable rate of deceleration.

Another object is an emergency braking system which utilizes the hydraulic system and other component parts of the hoist's operational braking system.

Another object is an emergency braking system designed to apply the brakes in the event of an electrical power failure at the mine hoist motor control.

Other objects may be found in the following specification, claims and drawings.

BRIEF DESCRIPTION OF THE DRAWINGS

The invention is illustrated more or less diagrammatically in the following drawings wherein:

FIGURE 1 is a somewhat schematic partial view, with some parts shown in cross-section, of the application of the emergency braking system of this invention to a hoist drum braking system; and FIGURE 2 is a schematic diagram showing the electric hydraulic actuator governor control system.

DESCRIPTION OF THE PREFERRED EMBODIMENT

A mine hoist braking system of the type with which the emergency braking system of this invention may be used is shown in part in FIGURE 1. A weight 11 is connected to one end of a lever 13 operatively connected to the brake shoes of a post type hoist drum brake (not shown). Upon downward movement due to gravity, the weight 11 rotates the lever 13 so as to apply the brakes to the hoist drum. Release of the brakes is accomplished by lifting the weight 11 through means of a piston 15 movably mounted in a cylinder 17. A rod 19 connects the piston and the weight 11. A conduit 21 carries hydraulic fluid under pressure into and out of the cylinder 17 to raise and lower the piston 15 and the brake weight 11.

The flow of hydraulic fluid through the conduit 21 is controlled by a brake operating valve 23. Hydraulic fluid under pressure is supplied to the brake operating valve 23 through a conduit 25 connected to an electric motor driven pump 27.

The brake operating control valve 23 includes a body 29 having two cylindrical passages 31 and 33 which are spaced apart and connected by spaced passages 35 and 37. Spool type valve plungers 39 and 41 are located respectively in cylindrical passages 31 and 33. Conduits 43 and 45 provide exhaust outlets respectively for the cylindrical passages 31 and 33. These conduits merge into conduit 47 which connects to the sump of the pump 27.

A conduit 49 connected to the conduit 21 on the brake side of the brake control valve 23 communicates with one end of the cylindrical passage 33. A conduit 51 connects to the opposite end of the cylindrical passage 33 and leads to a valve 53. The valve 53 is operated by a solenoid 55. When the solenoid 55 is energized, the valve 53 connects conduit 51 with a conduit 56 leading to conduit 25 to allow hydraulic fluid under pressure in the conduit 25 to pass into conduit 51. When solenoid 55 is de-energized, valve 53 disconnects conduits 51 and 56 and connects conduits 51 and 64 to permit the hyrdaulic fluid in conduit 51 to flow to the sump of the pump 27. Conduits 49 and 51 direct hydraulic fluid against opposite sides of the valve plunger 41 to move it back and forth in the cylindrical passage 33 to thereby control the flow of hydraulic fluid between the conduits 21, 25 and 45 and through the internal passages 35 and 37 of the brake valve 23.

The valve plunger 39 has a rod-like portion 57 which extends outwardly of the brake valve 23 and is pivotally connected to an operating arm 59. The arm 59 is connected by a linkage (not shown) to the brake shoe lever 13. This arm is also pivotally connected to an arm 61 which is affixed to the brake operating shaft 63 in such a manner that rotation of the shaft 63 will rotate the arms 61 and 59 to move the valve plunger 39 in the cylindrical passage 31. Movement of the valve plunger 39 will bring about changes in the flow of hydraulic fluid through the internal passages 35 and 37 of brake valve 23 and between the conduits 21, 25 and 43. The shaft 63 is the brake operating shaft and is connected to either manual or automatic controls which are used to operate the hoist drum brakes. However, for purposes of clarity, the connections of this shaft to the manual or automatic controls are not shown.

The plunger 41 is reciprocated in cylindrical passage 33 by changes in the pressure of hydraulic fluid from conduits 49 and 51 exerted against the ends thereof. As previously mentioned, de-energization of solenoid 55 will operate valve 53 to connect conduits 51 and 64, thereby exhausting the hydraulic fluid in conduit 51 to the sump of pump 27. The release of pressure at the conduit 51 end of the passage 33 will result in an unbalanced force caused by the hydraulic fluid in conduit 49 acting against plunger 41 and urging the plunger towards the conduit 51 end of the passage. Upon movement towards the conduit 51 end of the passage 33, plunger 41 will open exhaust conduit 45 to provide a path for drainage of the hydraulic fluid from the cylinder 17. The release of hydraulic fluid from cylinder 17 will also release the pressure in conduit 49 acting against the plunger 41 and urging it towards the conduit 51 end of the passage 33. However, with pressure removed from both of its ends, the plunger will remain in its position adjacent the conduit 51 end of the passage.

Energization of solenoid 55 will operate valve 53 to connect conduits 51 and 56 to permit hydraulic fluid in conduit 25 to flow through conduit 56 and into conduit 51. The buildup of hydraulic fluid in conduit 51 will create an unbalanced force against plunger 41 causing it to move towards the conduit 49 end of passage 33. As plunger 41 approaches its limit of travel towards the conduit 49 end of the passage, it will connect conduits 25 and 21 by opening passage 35 to permit flow of hydraulic fluid from conduit 25 into conduit 21 and cylinder 17 to raise the brake weight 11 and release the brake shoes.

The emergency application of the braking system is accomplished through means of a remote servo 79 which is controlled by an electric-hydraulic actuator 75. A suitable electric-hydraulic actuator and remote servo are sold by The Woodward Governor Company of Rockford, Ill.

The electric hydraulic actuator 75 operates the brake through rotation of the brake control rod 63 by means of a remote servo 79. The remote servo includes a cylinder (not shown) having a piston (not shown) mounted therein. A rod 80 connected to the piston extends out of the cylinder. The actuator 75 supplies hydraulic fluid to the cylinder of the remote servo to reciprocally move the piston. The remote servo acts against arms 81 and 83 affixed to the brake control rod 63. To provide for selectively connecting and disconnecting the remote servo and the arms 81 and 83, a pair of pistons 85 and 87 are operatively connected to the remote servo by means of rods 89 and 91 which in turn pivotally connect to a cross member 93. Cross member 93 is connected to the remote servo rod 80. The pistons 85 and 87 are positioned respectively in cylinders 95 and 97 which are pivotally connected respectively to the arms 81 and 83.

Hydraulic fluid to fill the cylinders 95 and 97 and thereby positively connect the remote servo 79 to the operating arms 81 and 83 is supplied from the hydraulic brake system by conduits 99 and 101 which are connected to the conduit 25 on the output side of the pump 27. The admission of hydraulic fluid into the cylinders 95 and 97 is controlled respectively by solenoid operated valves 103 and 105. Drain conduits 107 and 109 controlled respectively by the valves 103 and 105 are provided to drain hydraulic fluid from the cylinders 95 and 97. These drain conduits merge with conduit 47 which connects to the sump pump 27. A weight loaded accumulator 121 is connected to the conduit 25 to maintain hydraulic fluid pressure in the event that the pump 27 fails to operate.

A cross arm 125 is affixed at its center to the brake operating rod 63. Piston rods 126 and 127 are pivotally connected to opposite ends of said arm and the rods are connected respectively to pistons (not shown) in cylinders 128 and 129. These pistons and cylinders are arranged to bring about rotation of the arm 125 and operating shaft 63 upon operation of their respective solenoid operated valves 131 and 133 which admit hydraulic fluid to and exhaust it from the cylinders. The hydraulic fluid connections to the cylinders and the solenoid operated valves are arranged so that upon de-energization of the solenoid valves 131 and 133, cylinder 129 will be filled with hydraulic fluid and hydraulic fluid will be exhausted from cylinder 128 to bring about a clockwise rotation of the arm 125 as viewed in FIGURE 1. Upon energization of the solenoid valves, cylinder 128 will be filled with hydraulic fluid and cylinder 129 will be drained to bring about a counterclockwise rotation of arm 125 as viewed in FIGURE 1. To permit rotation of the brake operating shaft beyond the clockwise position determined by movement of the piston rod 127, a slot 125a is provided in the cross arms 125 at its pivotal connection to the piston rod 127 and provision is made for overtravel of the piston in cylinder 128. A spring 125b is provided to maintain the cross arm and piston rod 127 in operative contact. The cylinder 128 and 129 and the spring 125b are connected at their lower ends, as viewed in the drawing, to a support (not shown).

The electric hydraulic actuator 75 is driven by an electric motor 134. This motor is supplied with power from an alternator 135, which is mechanically driven from the mine hoist generator set (not shown). The alternator also supplies power through conductors 136 to the governor control 77 (FIGURE 2) and to the solenoid 55 which controls operation of the valve 53. The alternator is connected in the hoist motor electrical control loop circuit at 137 (FIGURE 2) so that in the event of its malfunction, it will cut power to the hoist motor as well as de-energize the solenoid 55 to exhaust hydraulic fluid from the cylinder 17, thus actuating the brakes.

A solenoid operated switch 138 is connected in parallel between the alternator 135 and the solenoid 55. The leads of the solenoid of switch 138 are connected to the hoist motor control panel (not shown). When power is supplied to the hoist motor, this solenoid will be energized and switch 138 will be held open. In the event of a power failure to the hoist motor control panel, switch 138 will close, thereby connecting solenoid 55 and alternator 135.

Another solenoid operated switch 139 is connected in series between the solenoid 55 and the alternator 135. The switch 139 is arranged to be closed upon energization of its solenoid and to open upon de-energization thereof. The leads of the solenoid of switch 139 connect to the manual or automatic controls for the mine hoist (not shown). Solenoid 139 is normally energized to keep its switch closed to supply current to solenoid 55. When the controls are operated to position the brake in its fully applied position, the solenoid 139 is de-energized to interrupt the circuit to solenoid 55 to thereby operate valve 53 which connects conduit 51 to conduit 64 to drain the hydraulic fluid from brake cylinder 17.

The governor control 77 shown in FIGURE 2 includes a speed section 141 and a speed reference section 143. The speed section is supplied with impulses from a magnetic pickup 145 which is mounted close to the teeth of a gear 147 attached to the pinion shaft of the mine hoist. The passing teeth of the gear create voltage impulses in the magnetic pickup which are transmitted to the speed section. The speed section converts the voltage impulses into a direct current voltage proportional to the rotational speed of the pinion gear and the speed of the hoist drum.

The speed reference section 143 is supplied with a speed voltage reference signal indicated at 148 which is obtained from the automatic controls for the mine hoist or from a tachometer generator driven from the hoist drum. This speed voltage reference signal is supplied to the speed reference section 143 through a voltage ramp 149. The voltages from the speed section and the speed reference section are connected to a summing point 151. If the two voltages are equal and of opposite polarity, there will be no voltage input to the amplifier section 153. When there is no input to the amplifier, the voltage output of the governor control which is supplied to the actuator by conductor 154 remains at its steady state value and the electric-hydraulic actuator 75 remains in its neutral position. A stability section 155 is connected to the amplifier section and is adjustable.

The voltage ramp 149, which is adjustable, has a resistor capacitor discharge network for providing a linearly decreasing voltage. When an emergency stop signal is given, the speed voltage reference signal 148 to the voltage ramp is broken and the voltage ramp will supply the speed reference section with a linearly decreasing voltage starting with a voltage which will be equivalent to the speed of the hoist at the time the emergency stop signal was given.

The use, operation and function of this invention are as follows:

The emergency braking system of this invention is intended for use with a mine hoist having a weight actuated, hydraulically releasable brake system. In such a system it is highly desirable to provide a uniform rate of deceleration of the hoist drum and its conveyances or skips under all operating conditions. A uniform rate of deceleration during emergency stops is difficult to obtain in a mine hoist due to the wide range of operating conditions which may be encountered. For example, in a double drum balanced type installation, an unbalanced load may be in a process of being raised or lowered with only one brake operating at the time an emergency stop is signaled. Also, a wide range of deceleration rates is imposed by the constant torque rating of the brake taken in conjunction with the unbalanced conditions caused by the weight of the wire cables.

The purpose of this invention is to provide a constant rate of deceleration regardless of unbalance caused by relative conveyance positions in the shaft. However, the stopping time should not be less than the periodic time of the skip and its supporting wire rope to avoid damage to the ropes.

The operational control of braking may be entirely automatic or may be manually controlled. Under automatic control, the brakes will prime, set and release in accordance with the programming of the automatic equipment. When the hoist is operated manually, the operation of the brake is interlocked with the manual electric switch controlling current to the hoist motor so that the brakes are set in braking engagement with the hoist drums when the hoist motor switch is in its neutral position. The brakes are moved to their prime positions when the hoist drum switch is moved to its creep speed position. In the prime position, the brake shoes are positioned at a fixed location close to the hoist drum but out of contact therewith. The brakes are fully released when the hoist motor switch is in all other operating positions.

In normal operation of the mine hoist, the brake prime solenoids 131 and 133 will be energized to exhaust hydraulic fluid from cylinder 129 and to fill cylinder 128 with hydraulic fluid. Also, the emergency solenoids 103 and 105 will be energized to interrupt the flow of hydraulic fluid to the hydraulic cylinders 95 and 97 and to open the exhaust conduits 107 and 109 to drain the hydraulic fluid from the cylinders. With the cylinders 95 and 97 emptied, the hydraulic actuator 75 and its remote servo 79 are operatively disconnected from the brake control rod 63 and this rod may be manipulated automatically or manually during normal operation of the braking system.

When an emergency stop is signaled, the prime solenoids 131 and 133 and the emergency solenoids 103 and 105 are de-energized. An emergency stop signal may be initiated by actuating one of the pushbuttons located at the hoist's main control, at the dumping level and at each loading level of each shaft. Such a signal may also be initiated automatically due to the opening of a safety interlock which may be installed, for example, on the gates and doors leading into the mine shafts. De-energization of the brake prime solenoids 131 and 133 exhausts hydraulic fluid from cylinder 128 and introduces hydraulic fluid into cylinder 129 to rotate the arm 125 and brake operating shaft 63 a limited amount. Rotation of shaft 63 through a limited arc moves the arms 61 and 59 a sufficient distance to slide the plunger 39 in cylindrical passage 31 to a position in which it shuts off the hydraulic fluid supply from the pump 27 to the piston 17 through internal passage 35. Movement of plunger 39 also opens conduit 43 to drain a portion of the hydraulic fluid in cylinder 17 back to the sump of pump 27. Removal of hydraulic fluid from cylinder 17 lowers piston 15 and weight 11 to move the brake rod 13 and the brake shoes into their prime positions. As previously mentioned, the prime position of the brake shoe is a fixed position relative to the hoist drum in which all slack is taken up and the brake shoe is positioned closely adjacent the hoist drum.

De-energization of the solenoids 103 and 105 admits hydraulic fluid into the cylinders 95 and 97 to move the pistons 85 and 87 to their extended positions relative to the cylinders to thereby operatively connect the remote servo 79 with the brake rod operating arms 81 and 83. With the remote servo 79 operatively connected to the arms 81 and 83, the actuator 75 is operatively connected to the brake valve plunger 39.

The operation of the hydraulic actuator 75 is controlled by the governor control 77 (FIGURE 2). Upon initiation of an emergency stop signal, the speed voltage reference signal 148 fed into the speed reference section 143, which is equal in voltage and opposite in polarity to the signal received from the magnetic pickup 145, is broken. Thereafter, the voltage ramp 149 supplies a signal to the speed reference section 143 which signal decreases in voltage at a linear rate starting at a voltage equivalent to the speed of the hoist drum at the time the emergency stop signal was initiated and ending at zero speed. As the voltage in the speed reference section 149 decreases linearly below the voltage in the speed section 141, which is obtained from the magnetic pickup 147, the voltage difference at summing point 151 is fed into the amplifier 153 which produces a signal calling for the hoist drum to be slowed. The amplifier output signal is fed to the hydraulic actuator 75 by conductor 154. Upon receipt of this signal, the hydraulic actuator 75 regulates the oil being supplied to the remote servo 79 so as to move the piston rod 80 out of its cylinder.

Since the remote servo 79 (FIGURE 1) is connected to the brake operating arms 81 and 83 by means of the energized and extended hydraulic cylinders 95 and 97, movement of the piston rod 80 of the remote servo will move the arms 81 and 83 to rotate the rod 63 thereby moving the plunger 39 downwardly in the cylindrical passage 31 of the brake valve 23. Downward movement of this plunger will completely open the conduit 43 to bleed all of the hydraulic fluid out of the cylinder 17, dropping the weight 11 and moving the brake shoes into contact with the hoist drum. The governor 77 will apply the brakes so that the deceleration of the hoist drum will closely follow the slope of the voltage ramp 149 to bring the hoist drum to a complete stop.

In the event that the hoist drum, upon application of the brakes, is slowed at a faster rate than is requested by the voltage ramp 149, the signal from the speed section 141 will be less than the signal from the speed reference section 143, and the signal at the summing point 151, as amplified, will indicate that the rotational speed of the hoist drum should be increased. Upon receipt of this signal, the electric hydraulic actuator 75 will change the flow of oil to the remote servo 79 and thereby retract the remote servo piston rod 80 and reduce the braking effect.

Electric power to operate the governor control 77 and the hydraulic actuator motor 134 is supplied through conductors 136 by an alternator 135 which is mechanically driven from the hoist motor generator set. The alternator also supplies power to solenoid 55 which operates valve 53, the valve controlling conduit 51 leading from the brake control valve 23. The provision of the electrical supply from the alternator prevents the solenoil 55 from operating the valve 53 to connect conduits 64 and 51 and bring the brakes to their "full on" condition in the event of an electrical power failure at the mine hoist motor. Thus, an electrical failure at the mine hoist motor will not bring about a bypassing of the governor control 77. A normally open switch 138 is connected in parallel and a normally closed switch 139 is connected in series between the alternator 135 and the solenoid 55. The automatic or manual control system will keep the solenoid of switch 139 energized during hoist operation to release the brakes. Switch 138 is connected to the hoist motor control panel. In the event of power failure, switch 139 will open and switch 138 will close to maintain power to the solenoid 55. If the alternator 135 malfunctions, it will open the hoist motor control loop circuit, to which it is connected at 137, to cut power to the hoist motor and also de-energize the solenoid 55 which applies the brakes by exhausting the hydraulic brake fluid from the piston 17 through the exhaust conduit 45.

In normal operation, whether manual or automatic, the electric hydraulic actuator 75 is not mechanically connected to the brake operating valve 23 because the hydraulic cylinders 95 and 97 are emptied and the pistons 85 and 87 are free to move in these pistons. This arrangement prevents the governor from bringing the hoist to an emergency stop in the event that the governor looses its signal since the governor is arranged to move automatically to the "brake on" position in the event of a signal loss. However, since the governor through the actuator 75 is not connected to the brake valve 23 until the cylinders 95 and 97 are filled with hydraulic fluid it will not apply the brakes while the hoist is running. The hoist will complete the trip and then stop on a protective shutdown.

While the preferred form of the invention has been described herein, it should be understood that suitable additions, alterations and variations may be made without departing from the invention's fundamental theme.

What is claimed is:

1. An apparatus for applying a braking system of a hoist drum under emergency stopping conditions to slow rotation of the hoist drum at a uniform rate of deceleration including:
    means to continuously provide signals indicative of the actual speed of rotation of said hoist drum,
    means to continuously provide reference signals indicative of the desired speed of rotation of said hoist drum during a deceleration period in which the speed of the drum is to decrease from its speed at the time of initiation of an emergency stop signal to zero at a uniform rate of deceleration,
    means to compare said desired speed signals with the signals indicating actual speed of rotation of said drum continuously during said period of deceleration and to continuously provide resultant signals indicating the difference between said actual speed signals and said desired speed signals, and
    means to utilize said resultant signals to apply and release said braking system to bring the actual speed of rotation of the hoist drum into conformity with the decreasing reference speed.

2. The structure of claim 1 further characterized in that said means to utilize said resultant signals to apply and release said braking system includes:
    an electric hydraulic actuator adapter to convert the resultant signal into a linearly applied force, and
    means connecting said actuator and said braking system to utilize said linearly applied force to apply and release said braking system.

3. The structure of claim 2 further characterized in that said means connecting said actuator and said braking system includes:
    means to selectively operatively connect and disconnect said actuator from said braking system.

4. The structure of claim 3 further characterized in that said means to operatively connect and disconnect said actuator from said braking system includes:
    at least one cylinder with a piston mounted therein for reciprocal movement relative thereto with the piston and cylinder being connected to the actuator and the braking system,
    a source of hydraulic fluid, and
    means to fill said cylinder with hydraulic fluid and to empty said fluid from said cylinder to move said piston to and from its extended position relative to said cylinder to operatively connect and disconnect said actuator and said braking system.

5. The structure of claim 1 further characterized in that:
    said means to continously provide signals indicative of the actual speed of rotation of said hoist drum includes a gear mounted on a pinion shaft of said hoist drum, a magnetic pickup positioned close to the teeth of said gear so that electrical impulses are formed in said pickup upon rotation of the gear, and means to convert said impulses into a direct current voltage proportional to the rotational speed of said pinion gear,
    said means to continuously provide reference signals indicative of the desired speed of rotation of said hoist drum during a deceleration period in which the speed of the drum decreases from its speed at the time of initiation of an emergency stop to zero at a uniform rate of deceleration includes a resistor capacitor discharge network which provides a direct current output voltage which decreases at a uniform linear rate, and
    said means to compare said desired speed signals and said actual speed signals and to provide resultant signals includes a summing point for said pinion gear speed voltage and said discharge network voltage and an amplifier to increase the magnitude of the resultant signals from said summing point.

6. An apparatus for applying the braking system of a hoist drum under emergency stopping conditions in which the braking system includes brake shoes which are weight actuated and hydraulically releasable and in which rotation of a brake operating rod moves a plunger in a brake valve to control the flow of hydraulic fluid to lift and lower said weight to release and actuate said brake shoes including:
    an electric hydraulic actuator adapted to control the flow of pressurized hydraulic fluid in accordance with a signal supplied thereto,
    a remote servo piston linearly movable by the pressurized hydraulic fluid controlled by said actuator,
    means for operatively connecting and disconnecting said servo piston from said brake operating rod including:
        a rod connected to said piston,
        an arm connected to said rod,
        a cylinder and a piston connected to said rod and said arm, and
        means to selectively fill and empty said cylinder with hydraulic fluid to operatively connect and disconnect said rod and said arm with said means arranged to fill said cylinder with hydraulic fluid upon initiation of an emergency stop,
    a priming means for said brake shoes include:
        an arm fixed to said brake shaft,
        a piston mounted in a cylinder connected to an end of said arm,
        means to control the flow of hydraulic fluid to and from said cylinder to move said piston and thereby rotate said shaft to move said brake valve plunger to and from a position which directs the flow of hydraulic fluid to move said brake shoe to a prime position relative to said hoist drum with said means arranged to move said brake shoe to said prime position upon initiation of an emergency stop,
    means to continuously provide signals indicative of the actual speed of rotation of said hoist drum including:
        a gear mounted on a pinion shaft of said hoist drum,
        a magnetic pickup position close to the teeth of said gear so that electrical impulses are formed in said pickup upon rotation of the gear, and
        means to convert said impulses into a direct current voltage proportional to the rotational speed of said pinion gear, means to continuously provide signals indicative of the desired speed of rotation of said hoist drum during a deceleration period in which the speed of the hoist drum decreases from its speed at the time of an initiation of an emergency stop to zero at a uniform rate of deceleration including a resistor capacitor discharge network which provides a direct current output voltage which decreases at a uniform linear rate, means to compare said desired speed voltage and said actual speed voltage and to provide a resultant voltage including a summing point for said pinion gear speed voltage and said discharge network voltage and an amplifier to increase the magnitude of the resultant voltage from said summing point, means to transmit said magnified resultant voltage signal to said electric hydraulic actuator for operation thereof, and means to provide another signal indicative of the actual speed of rotation of said drum and proportional to said similar signal from said pinion to said summing point with said signal adapted to override said desired speed signal until an emergency stop is initiated.

7. An apparatus for applying a braking system of a mine hoist under emergency stopping conditions in which the braking system is of the type which is applied by movement of an operating lever including:

means to continuously measure the rotational speed of the mine hoist drum and to provide electrical signals indicative thereof and proportional thereto, means to continuously provide electrical signals commencing at a value proportional to the rotational speed of the mine hoist drum at the initiation of an emergency stop and changing in value at a linear rate to a value proportional to zero speed of the mine hoist drum, means to continuously compare said signals and to provide a resultant electrical signal indicating the difference between said signals, and means to provide a force to move the operating lever in accordance with the value of said resultant electrical signal.

References Cited

UNITED STATES PATENTS

| 3,398,995 | 8/1968 | Martin | 303—21 |
| 2,421,187 | 5/1947 | Derungs | 188—180 X |
| 2,439,350 | 4/1948 | Tarbox | 188—180 X |
| 3,193,057 | 7/1965 | Rudquist et al. | 188—180 |
| 3,235,036 | 2/1966 | Meyer et al. | 188—181 |

DUANE A. REGER, Primary Examiner

U.S. Cl. X.R.

303—21